United States Patent [19]

Tsutsumi et al.

[11] Patent Number: 4,782,119

[45] Date of Patent: Nov. 1, 1988

[54] RUBBER COMPOSITION COMPRISING A STYRENE-BUTADIENE BLOCK COPOLYMER HAVING TWO KINDS OF BLOCKS

[75] Inventors: Fumio Tsutsumi, Yokkaichi; Akio Iakashima, Kameyama; Mitsuhiko Sakakibara, Yokkaichi; Noboru Oshima, Suzuka; Tatsuo Fujimaki, Higshimurayama; Yoshiyuki Morimoto, Kodaira, all of Japan

[73] Assignees: Japan Synthetic Rubber Co., Ltd.; Bridgestone Corporation, both of Tokyo, Japan

[21] Appl. No.: 769,923

[22] Filed: Aug. 27, 1985

[30] Foreign Application Priority Data

Aug. 27, 1984 [JP] Japan .................. 59-178064

[51] Int. Cl.$^4$ ............................................ C08F 297/04
[52] U.S. Cl. ...................................... 525/314; 525/98; 525/99; 525/258; 525/256; 525/914
[58] Field of Search ............................................ 525/314

[56] References Cited

U.S. PATENT DOCUMENTS 4,433,109 2/1984 Takeuchi et al. ................ 525/314
4,463,133 7/1984 Takeuchi et al. ................ 525/99

FOREIGN PATENT DOCUMENTS 005440 12/1981 European Pat. Off. .
3220680 1/1983 Fed. Rep. of Germany .
5753507 9/1980 Japan .

Primary Examiner—Wilbert J. Briggs, Sr.
Attorney, Agent, or Firm—Sughrue, Mion, Zinn, Macpeak, and Seas

[57] ABSTRACT

A rubber composition containing at least 20% by weight of a styrene-butadiene block copolymer consisting of a block (A) and a block (B) characterized in that: (i) the block (A) is a styrene-butadiene copolymer block having the content of styrene of 10–80% by weight and the average content of the vinyl bonds in the butadiene portion of 30–70% by weight; (ii) the block (B) is a polybutadiene block with the average content of the vinyl bonds in the butadiene portion being not more than 60% by weight (iii) the styrene-butadiene block copolymer contains at least 20% by weight of each of the block (A) and the block (B); (iv) the average content of the vinyl bonds in the butadiene portion of the block (A) is greater by at least 5% by weight than that of the block (B); (v) the glass transition temperature of the block (A) is higher by at least 30° C. than that of the block (B); (vi) the whole content of the bound styrene in the above block copolymer is 5–40% by weight; (vii) the ratio Mw/Mn between the weight average molecular weight Mw and the number average molecular weight Mn of the block copolymer is 1.8–5.0 when calculated as polystyrene according to the gel permeation chromatogram; and (viii) the Mooney's viscosity ($ML_{1+4}^{100° C.}$) of the block copolymer is 20–150.

14 Claims, 1 Drawing Sheet

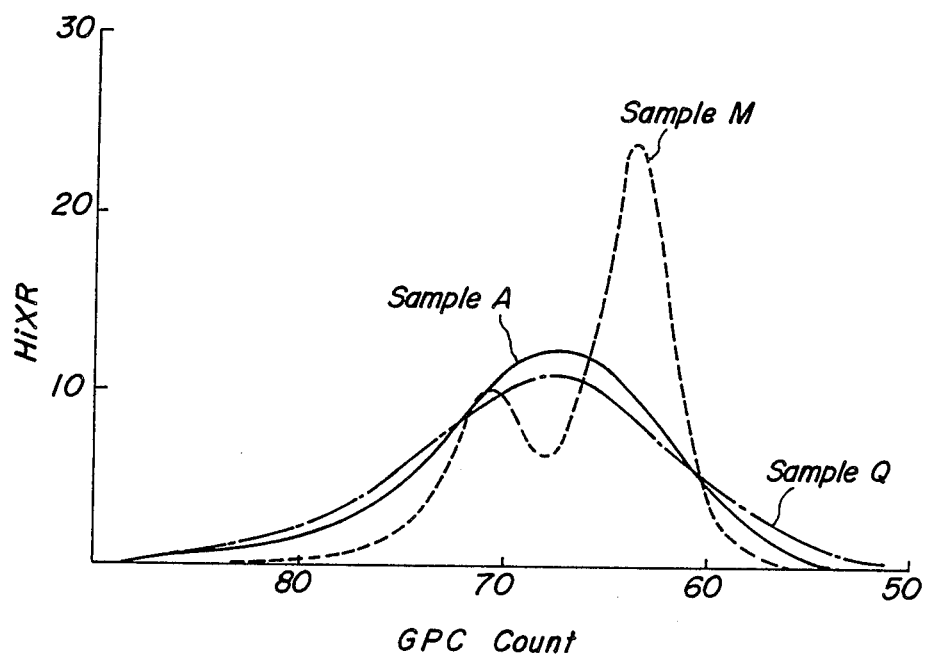

RUBBER COMPOSITION COMPRISING A STYRENE-BUTADIENE BLOCK COPOLYMER HAVING TWO KINDS OF BLOCKS

BACKGROUND OF THE INVENTION

1. Field of the Invention

The present invention relates to a rubber composition composed of a block copolymer which is derived from styrene and butadiene as raw materials, and has two kinds of different blocks, the rubber composition being suitable for tire treads.

2. Related Art Statement

There have been recently getting more and more severe requirements for the running stability and the low fuel consumption in the automobiles, and there have been strongly demanded rubbers which are high in wet skid resistance and ice skid resistance and low in rolling friction resistance in addition to the breaking properties such as wear resistance which had been heretofore demanded with respect to the rubber composition for the tread portions of the automobile tires. However, it is difficult to simultaneously meet these properties. Particularly, the wet skid property, the ice skid property and the rolling friction property are in the contradictory relation with one another. Among the conventional polymers, polymers having a relatively high glass transition temperature (Tg) such as an emulsion polymerized SBR are excellent in the wet skid property, while polymers having lower Tg which are represented by a high cis 1,4-BR are excellent in the ice skid property and the rolling friction property. However, the ice skid property is related to the properties at low temperatures, while the rolling friction property relates to the properties at temperatures not lower than room temperature. In order to meet the severe requirements called for regarding the current tires, although the Tg being low is a prerequisite condition so that the ice skid property and the rolling friction property may be excellent, but it is hard to say that the low Tg is a sufficient condition. That is, when the above properties are represented by the viscoelastic indexes of the vulcanized rubber, the wet skid property is represented by tan $\delta$ near 0° C. (the larger the tan $\delta$, the more excellent the wet skid property), while the ice skid property is represented by the glass transition temperature (the smaller Tg, the better the ice skid property), and the rolling friction property is represented by the tan $\delta$ at 50°–70° C. (the smaller the tan $\delta$, the more excellent rolling friction property). A contradictory question arises when the required properties are simultaneously met. Under these circumstances, there have been made trials for harmonizing the above-mentioned contradictory properties through blending different kinds of polymers together. However, although the properties could be improved to some extent by such harmonization, it is the present situation that all the currently required properties are not met yet.

PROBLEMS TO BE RESOLVED BY THE PRESENT INVENTION

Recently, the improvements on the SBR and BR obtained mainly by using an organic lithium initiator have been tried, and SBR and BR having a relatively high content of vinyl bonds in the butadiene (hereinafter abbreviated as "BD") portion have been improved to a large extent with respect to the balancing of the wet skid property and the rolling friction property as compared with the conventional emulsion polymerized SBR, natural rubber, and high cis 1,4-BR (see U.S. Pat. No. 4,334,567, Japanese Patent Application Laid-open No. 110,753/1981 and British Pat. No. 1,166,832, etc.). However, the above-mentioned polymer is inferior in the ice skid property, so that required properties intended by the present invention can not be met.

Upon having made examination to further improve the wet skid property and the rolling friction property in the styrene-butadiene copolymer obtained by using the organic lithium initiator, the present inventors have acquired the interesting knowledge that the above-mentioned properties are improved by a styrene-butadiene block copolymer comprising two different kinds of block portions having different contents of bound styrene and different contents of vinyl bonds in the BD portion or a branched copolymer thereof, and a peak of a dispersion curve of temperature-tan $\delta$ according to the dynamic measuring method becomes broad because the two kinds of the block portions having different glass transition points become mutually compatible during the vulcanization step (see Japanese Patent Application Laid-open No. 109,817/9182 and Japanese Patent Application Laid-open No. 200,439/1982).

After the present inventors had further strenuously studied the phenomenon that the peak of the dispersion curve of the temperature-tan $\delta$ becomes broad, they have found that the wet skid property, the ice skid property, and the rolling friction property can be well balanced with one another by setting the difference in the glass transition temperature (Tg) between the respective block portions of the polymer constant, and keeping at a specific value the ratio Mw/Mn between the weight average molecular weight and the number average molecular weight when calculated in terms of polystyrene at a specific value.

On the other hand, since the styrene-butadiene copolymer rubber obtained by organic lithium is inferior in processability as compared with the styrene-butadiene copolymer rubber obtained through emulsion polymerization, improvement is required. However, according to the present invention, the processability is largely improved.

SUMMARY OF THE INVENTION

An object of the present invention is to provide a rubber composition of a styrene-butadiene copolymer rubber in which the wet skid property, the ice skid property, the rolling friction property, and breaking properties are well balanced and the processability is improved.

That is, according to the present invention, there is a provision of a rubber composition containing at least 20% by weight of a styrene-butadiene block copolymer consisting of a block (A) and a block (B), characterized in that:

(i) the block (A) is a styrene-butadiene copolymer block having the content of styrene of 10–80% by weight and the average content of the vinyl bonds in the butadiene portion of 30–70% by weight;

(ii) the block (B) is a polybutadiene block with the average content of the vinyl bonds in the butadiene portion being not more than 60% by weight;

(iii) the styrene-butadiene block copolymer contains at least 20% by weight of each of the block (A) and the block (B);

(iv) the average content of the vinyl bonds in the butadiene portion of the block (A) is greater by at least 5% by weight than that of the block (B);

(v) the glass transition temperature of the block (A) is higher by at least 30° C. than that of the block (B);

(vi) the whole content of the bound styrene in the above block copolymer is 5–40% by weight;

(vii) the ratio Mw/Mn between the weight average molecular weight Mw and the number average molecular weight Mn of the block copolymer is 1.8–5.0 when calculated as polystyrene according to gel permeation chromatography; and (viii) the Mooney's viscosity ($ML_{1+4}^{100°\ C.}$) of the block copolymer is 20–150.

According to a preferred aspect of the present invention, there is a provision of the rubber composition in which at least one kind of a metal selected from the group consisting of Si, Sn, Pb and Ge is contained in an amount of not less than 50 ppm in the block copolymer.

These and other objects, features and advantages of the present invention will be well appreciated upon reading of the following description of the invention when taken in conjunction with the attached drawing, with the understanding that some modifications, variations and changes of the same could be easily done by those skilled in the art to which the invention pertains without departing from the spirit of the invention or the scope of claims appended hereto.

BRIEF DESCRIPTION OF THE DRAWING

In order to better understand the invention, reference is made to a drawing, wherein FIG. 1 shows results on measurement in gel permeation chromatography of Samples A, M and Q.

DETAILED DESCRIPTION OF THE INVENTION

As compared with the copolymers disclosed in Japanese Patent Application Laid-open Nos. 102,912/1982, 109,817/1982 and 200,439/1982, the rubber composition according to the present invention is characterized in that (1) there are differences in the requirements between the block portions (A) and (B); and (2) the molecular weight distribution range is newly defined as the Mw/Mn=1.8–5.0, and thus the rubber composition according to the present invention differs from the polymers disclosed in the above publications. The breaking properties and the processability of the rubber composition according to the present invention are largely improved.

Japanese Patent Application Laid-open Nos. 53,511/1982 and 53,507/1982 disclose a polymer having the continuous distribution of the bound styrene along the molecular weight distribution with Mw/Mn being in a given range or a polymer in which the content of the vinyl bonds continuously varies along with the molecular weight distribution with respect to the microstructure distribution of the butadiene portion analyzed according to the GPC follows. These polymers are difficult to attain the balanced physical properties and the processability intended by the present invention. The excellent balance among the wet skid property, the ice skid property and the rolling friction property and the excellent processability can be attained according to the present invention by using the copolymer in which two kinds of blocks (A) and (B) having different monomer compositions and a difference of not less than a specific value in the glass transition temperature therebetween are blocked through the polymerization step, and the molecular weight distribution of the copolymer represented by Mw/Mn is restricted to the specific range.

The physical properties aimed at by the present invention can not be obtained by merely blending a copolymer having the same bound styrene and vinyl bonds as the block (A) and a polymer having the same vinyl bonds as the block (B) together.

When at least one metal selected from the group consisting of Si, Sn, Pb and Ge is contained in the block copolymer according to the present invention in an amount of not less than 50 ppm, preferably not less than 100 ppm in a state that it is bonded to the polymer, the breaking properties are improved. Particularly, when Sn and/or Pb is contained in not less than a specific amount, the rolling friction resistance property and the breaking properties are preferably improved.

The styrene-butadiene block copolymer of the present invention can be obtained according to a continuous polymerization method using an organic lithium initiator in the presence of a polar compound such as an ether compound or a tert.-amine compound. First, after the block (A) or the block (B) is polymerized, the remaining block portion is polymerized. If need be, the block copolymer containing the copolymer with metal-polymer bonds can be obtained by the addition of at least one metal selected from compounds of Si, Sn, Pb and Ge. The content of the vinyl bonds in the butadiene portion can be controlled by varying the content of the above polar compound in the polymerization system or the polymerization temperature in the polymerization step.

As the compounds of Si, Sn, Pb and Ge, use may be made of $R_nMX_{4-n}$ in which R is an alkyl group, an aryl group, a cycloalkyl group, an alkenyl group, or a phenyl group each having $C_1$–$C_{20}$; X is a halogen or $R^1CO_2$— in which $R^1$ is the same as R; n is in a range of 0–3; and M is Si, Sn, Pb or Ge.

The content of the bound styrene in the block (A) is in a range of 10–80% by weight, preferably 20–80% by weight, and more preferably 25–75% by weight, and the total content of the bound styrene in the block copolymer is 5–40% by weight, preferably 10–40% by weight, more preferably 15–35% by weight. If the content of the bound styrene of the block (A) is less than 10% by weight, the wet skid property becomes unsatisfactory. If the content of the bound styrene of the block (A) is more than 80% by weight, the rolling friction property and the breaking properties are undesirably deteriorated. No bound styrene is contained in the block (B). If the styrene is contained in the block (B), the balance between the wet skid property and the ice skid property is damaged. If the total content of the bound styrene in the block copolymer is less than 5% by weight, the breaking properties and the ice skid property are deteriorated, while if it exceeds 40% by weight, the rolling friction property and the ice skid property are unsatisfactorily poor.

The average content of the vinyl bonds in the butadiene portion is 30–70% by weight, preferably 35–70% by weight in the case of the block (A), and with respect to the block (B) not more than 60% by weight, and preferably not more than 55% by weight.

The average content of the vinyl bonds of the block (A) is larger by at least 5% by weight than that of the block (B).

If the content of the vinyl bonds in the block (A) is less than 30% by weight, it is not preferable for securing the glass transition temperature difference, and the balance between the rolling friction performance and the wet skid performance is unsatisfactory at that time. If the content of the vinyl bonds exceeds 70% by weight, the breaking properties become poor. Although the total content of the vinyl bonds in the block copolymer according to the present invention is not specifically restricted, it is preferably in a range of 25–60% by weight. Outside this range, the balance between the wet skid property and the rolling friction property is deteriorated.

If the difference in the average content of the vinyl bonds between the blocks (A) and (B) is outside the range of the present invention, it is unfavorable for broadening the peak of the temperature-dispersion curve of tan δ, and the balance in the physical properties becomes poor.

In the block copolymer according to the present invention, it is necessary that the glass transition temperature (Tg) of the block (A) is higher by at least 30° C., preferably by at least 40° C. than that of the copolymer block (B). If the difference in Tg is less than 30° C., the balance between the wet skid property and the ice skid property can not be obtained.

In the block copolymer according to the present invention, the block (A) and the block (B) are each contained in an amount of not less than 20% by weight, preferably not less than 30% by weight. If the content is less than 20% by weight, the balance between the wet skid property and the ice skid property is unsatisfactorily poor.

With respect to the molecular weight distribution of the block copolymer according to the present invention, the ratio Mw/Mn between the weight average molecular weight and the number average molecular weight when calculated in terms of the polystyrene according to the gel permeation chromatogram is 1.8–5.0, preferably 1.8–3.0, and more preferably the molecular weight distribution is unimodal. If the Mw/Mn is less than 1.8, the processability is poor, while if it is more than 5.0, the rolling friction resistance property is deteriorated. At that time, although the block copolymer having the polymodal distribution with the Mw/Mn being in the range of the present invention can be obtained by blending the block copolymers with different molecular weights, it is inferior in the balancing among the physical properties such as the breaking properties, friction resistance property, etc.

The Mooney viscosity, $ML_{1+4}^{100°C.}$, of the block copolymer according to the present invention is preferably 20–150. If it is less than 20, the rolling friction property is poor, while if it is over 150, the processability becomes poor.

The block copolymer according to the present invention is blended with one or more kinds of rubbers selected from the group consisting of natural rubber, cis 1,4-polyisoprene rubber, polybutadiene rubber, other styrene-butadiene copolymer rubber, ethylenepropylene-diene terpolymer rubber (EPDM), butyl rubber, halogenated EPDM, and halogenated butyl rubber.

The content of the block copolymer in the rubber composition according to the present invention is required to be at least 20% by weight, preferably not less than 30% by weight. If it is less than this range, the physical properties aimed at by the present invention, particularly, the wet skid property, the ice skid property and the rolling friction property can not be simultaneously met.

The rubber composition containing the block copolymer obtained according to the present invention has excellent wet skid property, ice skid property and rolling friction property and is excellent in the breaking properties. Therefore, it can be favorably used as the rubber material for the tire tread. At that time, as compounding agents, use may be made of the ordinarily used various compounding agents such as carbon black, process oil (aromatic oil, naphthenic oil, paraffinic oil, etc.), filter, vulcanization accelerator, vulcanizing agent as they are.

Examples

In the following, the present invention will be described more in detail with reference to specific Examples, but the invention will never be restricted to those Examples so long as the scope of the invention is not lost.

Examples 1–14 and Comparative Examples 1–9

Polymers used in the following Examples and Comparative Examples were obtained by the following method according to the polymerizing recipe in Table 1.

Sample A:

Into a first reactor of an inner volume of 20 liters with a stirrer and a heating jacket were continuously supplied by pumps 20 g/min of butadiene containing 30 ppm of 1,2-butadiene as a monomer, 150 g/min of cyclohexane and 0.025 g/min of tetrahydrofuran as a solvent, and 0.065 g of n-butyl lithium as a catalyst with respect to 100 g of the whole monomer, and then the temperature of the first reactor was controlled to be 70° C. The conversion at the outlet of the first reactor was not less than 90%. At an inlet of a second reactor were continuously fed by pumps 5 g/min of butadiene, and 5 g/min of styrene, 9 g/min of tetrahydrofuran, and then the temperature of the reactor was controlled to be 70° C.

At a top outlet of the second reactor, tin tetrachloride was continuously added at a molar ratio of ¼ with respect to the n-butyl lithium, and a reaction product from the second reactor was introduced to a third reactor connected to the second reactor to perform the reaction. At an outlet of the third reactor, di-tert-butyl-p-cresol was added in an amount of 0.7 part by weight with respect to 100 parts by weight of the rubber portion, and then desolvation and drying were carried out according to an ordinary manner. The thus obtained final product was analyzed, and analysis results were shown in Table 2.

Samples B–L, N, O and P:

Samples with polymerizing recipe shown in Table 1 were obtained according to the same method as in Sample A. Analysis results were shown in Table 2.

Sample M:

After 200 g of cyclohexane, 270 g of butadiene, and 0.33 g of tetrahydrofuran were charged into 5 liter reactor, 0.26 g of n-butyl lithium was added thereto as a catalyst. Then, while the temperature was controlled to be in a range of 60°–80° C., polymerization was carried out. After the conversion reached 90% or more, 67 g of butadiene, 67 g of styrene, and 125 g of tetrahydrofuran were added thereto, and polymerization was performed while the temperature was controlled to be 70° C. After the polymerization was finished, tin tetrachloride was added at a molar ratio of ¼ with respect to the n-butyl lithium to perform the reaction. Thereafter, a predetermined amount of di-tert-butylcresol was added, and desolvation and drying were carried out according to an ordinary manner. The final reaction product was analyzed, and analysis results were shown in Table 2.

Sample Q:

A polymer was obtained in the same manner as in Sample A except that dilithiobutane was used as lithium initiator.

Sample R:

A polymer was obtained in the same manner as in Sample A except that n-butyl lithium was continuously supplied in an amount of 0.045 g with respect to 100 g of the whole monomer.

Samples S and T:

Polymers were obtained in the same manner as in Sample A except that the charge composition of the monomers were changed in polymerization.

Sample U:

A polymer was obtained in the same manner as in Sample A except that the fed amount of tetrahydrofuran was changed in the polymerization of the copolymer block (B).

The content of styrene and the content of vinyl bonds in the polymer were determined by an infrared spectrophotometer. The content of a metal in the block copolymer was analyzed by an atomic-sbsorption spectroscopy after the polymer was dissolved into toluene again and re-purification was carried out through precipitation with a large amount of methanol. Mw/Mn as the index of the molecular weight distribution was determined by using a gel permeation chromatography (GPC) (GPC column manufactured by WATERS Co., Ltd.: STYRAGEL-$10^6$, $10^6$, $10^5$, $10^4$ (4 feets×4), solvent: tetrahydrofuran).

Compounded mixtures were prepared according to the compounding recipe shown in Table 3 using Samples A-P. Vulcanization conditions were 145° C.—30 minutes. The properties of the thus obtained vulcanizates were shown in Table 4.

The wet skid property (measured at room temperature) and the ice skid property (measured at $-10°$ C.) were measured by a skid resistance meter manufactured by Stanley Co., Ltd. Values of tan δ at 50° C. were used as the index of the rolling friction resistance (the values smaller, the better the rolling friction property).

As compared with Comparative Examples 1–9, Examples 1–14 are excellent in the balance among the wet skid property, the ice skid property and the rolling friction property as well as in the processability.

TABLE 1

| Sample | First stage polymerization (Block (B)) | | Second stage polymerization (Block (A)) | | | Metal compound | |
|---|---|---|---|---|---|---|---|
| | butadiene content (g/min) | tetrahydrofuran content (g/min) | butadiene content (g/min) | styrene content (g/min) | tetrahydrofuran content (g/min) | | |
| B | 15 | 0.025 | 7.5 | 7.5 | 9 | $SnCl_4$ | (¼ molar ratio with respect to n-butyl lithium) |
| C | 20 | 0.025 | 5 | 5 | 9 | $Bu_3SnCl$ | (1 molar ratio with respect to n-butyl lithium) |
| D | 20 | 0.025 | 5 | 5 | 9 | $Bu_2SnCl_2$ | (½ molar ratio with respect to n-butyl lithium) |
| E | 20 | 0.025 | 5 | 5 | 9 | $SiCl_4$ | (¼ molar ratio with respect to n-butyl lithium) |
| F | 20 | 0.025 | 5 | 5 | 9 | | Nothing |
| G | 20 | 1 | 5 | 5 | 9 | $SnCl_4$ | (¼ molar ratio with respect to n-butyl lithium) |
| H | 20 | 9 | 5 | 5 | 0 | $SnCl_4$ | (¼ molar ratio with respect to n-butyl lithium) |
| I | 27 | 0.025 | 1.5 | 1.5 | 9 | $SnCl_4$ | (¼ molar ratio with respect to n-butyl lithium) |
| J | 3 | 0.025 | 13.5 | 13.5 | 9 | $SnCl_4$ | (¼ molar ratio with respect to n-butyl lithium) |
| K | 20 | 0.025 | 4.5 | 0.5 | 9 | $SnCl_4$ | (¼ molar ratio with respect to n-butyl lithium) |
| L | 20 | 0.025 | 5 | 5 | 0 | $SnCl_4$ | (¼ molar ratio with respect to n-butyl lithium) |
| N | 20 | 0.025 | — | — | — | $SnCl_4$ | (¼ molar ratio with respect to n-butyl lithium) |
| O | — | — | 10 | 10 | 9 | $SnCl_4$ | (¼ molar ratio with respect to n-butyl lithium) |
| P | — | — | 16.6 | 3.4 | 0.06 | $SnCl_4$ | (¼ molar ratio with respect to n-butyl lithium) |
| Q | 20 | 0.025 | 5 | 5 | 9 | $Bu_2SnCl_2$ | (½ molar ratio with respect to dilithiobutane) |
| R | 20 | 0.025 | 5 | 5 | 9 | $SnCl_4$ | (¼ molar ratio with respect to n-butyl lithium) |
| S | 15 | 0.025 | 9.7 | 5.3 | 9 | $SnCl_4$ | (¼ molar ratio with respect to n-butyl lithium) |
| T | 13 | 0.025 | 6.0 | 11.0 | 9 | $SnCl_4$ | (¼ molar ratio with respect to n-butyl lithium) |
| U | 20 | 6 | 5 | 5 | 3 | $SnCl_4$ | (¼ molar ratio with respect to n-butyl lithium) |

TABLE 2

| Sample | Block (B) vinyl bonds in butadiene (%) | Block (B) Tg (°C.) | Block (A) vinyl bonds (%) | Block (A) bound styrene (%) | Block (A) Tg (°C.) | Total vinyl bonds (%) | Total bound styrene (%) | B/A (block ratio) | Metal content (ppm) | $M^{100°C.}_{1+4}$ | Mw/Mn |
|---|---|---|---|---|---|---|---|---|---|---|---|
| A | 30 | −95 | 51 | 50 | −10 | 34 | 17 | 2/1 | 160 | 61 | 2.4 |
| B | 29 | −95 | 52 | 49 | −11 | 37 | 24 | 1/1 | 150 | 57 | 2.2 |
| C | 31 | −95 | 50 | 50 | −10 | 34 | 16 | 2/1 | 620 | 31 | 2.3 |
| D | 30 | −95 | 51 | 49 | −10 | 34 | 17 | 2/1 | 310 | 54 | 2.2 |
| E | 28 | −96 | 50 | 50 | −10 | 33 | 17 | 2/1 | 160 | 62 | 2.4 |
| F | 30 | −95 | 51 | 50 | −9 | 34 | 16 | 2/1 | 0 | 32 | 1.9 |
| G | 41 | −86 | 50 | 49 | −11 | 43 | 17 | 2/1 | 150 | 55 | 2.4 |
| H | 71 | −58 | 51 | 50 | −10 | 67 | 17 | 2/1 | 140 | 54 | 2.3 |
| I | 30 | −95 | 49 | 49 | −10 | 31 | 5 | 9/1 | 150 | 61 | 2.4 |
| J | 29 | −95 | 51 | 48 | −11 | 47 | 43 | 1/9 | 160 | 62 | 2.1 |
| K | 31 | −94 | 61 | 9 | −57 | 40 | 3 | 2/1 | 170 | 58 | 2.5 |
| L | 30 | −95 | 24 | 50 | −41 | 29 | 16 | 2/1 | 140 | 60 | 2.4 |
| M | 31 | −95 | 50 | 50 | −12 | 34 | 17 | 2/1 | 150 | 59 | 1.2 |
| N | 30 | −95 | — | — | — | 30 | 0 | — | 160 | 57 | 2.3 |
| O | — | — | 50 | 50 | −11 | 50 | 50 | — | 150 | 58 | 2.2 |
| P | — | — | 34 | 17 | −76 | 34 | 17 | — | 160 | 56 | 2.3 |
| Q | 30 | −95 | 52 | 50 | −10 | 34 | 17 | 2/1 | 310 | 65 | 4.5 |
| R | 30 | −95 | 51 | 50 | −10 | 34 | 17 | 2/1 | 110 | 140 | 3.0 |
| S | 29 | −96 | 53 | 35 | −25 | 38 | 18 | 1/1 | 160 | 58 | 2.3 |
| T | 30 | −95 | 49 | 65 | 6 | 36 | 36.5 | 13/17 | 170 | 56 | 2.2 |
| U | 55 | −73 | 51 | 50 | −10 | 54 | 17 | 2/1 | 160 | 54 | 2.1 |

TABLE 3

| | Parts by weight |
|---|---|
| Polymer | 100 |
| HAF carbon black | 50 |
| Aromatic oil | 10 |
| Stearic acid | 2 |
| Zinc oxide | 3 |
| Antioxidant 810 NA*1 | 1 |
| Accelerator | |
| CZ*2 | 0.6 |
| M*3 | 0.6 |
| D*4 | 0.4 |
| Sulfur | 1.5 |

Note:
*1 N—phenyl-N'—isopropyl-p-phenylenediamine
*2 N—cyclohexyl-2-benzothiazolyl sulfenamide
*3 2-mercaptobenzothiazole
*4 1,3-diphenylguanidine

TABLE 4

| | Polymer Sample | Polymer Part | NR (part) | cis BR*1 (part) | Emulsion polymerized SBR*2 (part) | Elongation*3 | Tensile strength*3 (kg/cm²) | tan δ*4 at 50° C. | Wet skid*5 (index) | Ice skid*5 (index) | Lambourn abrasion*5 (index) | Processability*6 |
|---|---|---|---|---|---|---|---|---|---|---|---|---|
| Example | | | | | | | | | | | | |
| 1 | A | 70 | 30 | — | — | 430 | 265 | 0.119 | 110 | 110 | 108 | 9 |
| 2 | B | 70 | 30 | — | — | 420 | 272 | 0.123 | 115 | 101 | 109 | 10 |
| 3 | C | 70 | 30 | — | — | 410 | 267 | 0.110 | 109 | 108 | 110 | 9 |
| 4 | D | 70 | 30 | — | — | 420 | 262 | 0.112 | 108 | 109 | 110 | 9 |
| 5 | E | 70 | 30 | — | — | 410 | 258 | 0.127 | 111 | 108 | 107 | 8 |
| 6 | F | 70 | 30 | — | — | 420 | 252 | 0.125 | 109 | 109 | 106 | 8 |
| 7 | G | 70 | 30 | — | — | 430 | 259 | 0.118 | 113 | 103 | 105 | 9 |
| 8 | A | 70 | 15 | 15 | — | 420 | 254 | 0.117 | 108 | 112 | 107 | 9 |
| 9 | A | 70 | — | 15 | 15 | 390 | 252 | 0.122 | 109 | 109 | 106 | 9 |
| 10 | Q | 70 | 30 | — | — | 450 | 275 | 0.127 | 115 | 112 | 110 | 10 |
| *7 11 | R | 70 | 30 | — | — | 460 | 260 | 0.132 | 114 | 112 | 107 | 10 |
| 12 | S | 70 | 30 | — | — | 430 | 265 | 0.112 | 108 | 114 | 108 | 8 |
| 13 | T | 70 | 30 | — | — | 430 | 266 | 0.123 | 116 | 107 | 109 | 10 |
| 14 | U | 70 | 30 | — | — | 410 | 261 | 0.120 | 118 | 105 | 108 | 10 |
| Comparative Example | | | | | | | | | | | | |
| 1 | H | 70 | 30 | — | — | 400 | 237 | 0.130 | 120 | 90 | 99 | 9 |
| 2 | I | 70 | 30 | — | — | 390 | 218 | 0.112 | 87 | 125 | 92 | 6 |
| 3 | J | 70 | 30 | — | — | 400 | 244 | 0.141 | 125 | 72 | 103 | 10 |
| 4 | K | 70 | 30 | — | — | 380 | 215 | 0.112 | 92 | 120 | 97 | 7 |
| 5 | L | 70 | 30 | — | — | 410 | 259 | 0.117 | 94 | 112 | 107 | 8 |
| 6 | M | 70 | 30 | — | — | 390 | 258 | 0.105 | 109 | 107 | 105 | 5 |
| 7 | N/O | 49/21 | 30 | — | — | 380 | 221 | 0.150 | 118 | 90 | 96 | 8 |
| 8 | — | — | 30 | — | 70 | 470 | 280 | 0.147 | 93 | 117 | 111 | 10 |

TABLE 4-continued

| Polymer Sample | Part | NR (part) | cis BR*1 (part) | Emulsion polymerized SBR*2 (part) | Elongation*3 | Tensile strength*3 (kg/cm²) | tan δ*4 at 50° C. | Wet skid*5 (index) | Ice skid*5 (index) | Lambourn abrasion*5 (index) | Processability*6 |
|---|---|---|---|---|---|---|---|---|---|---|---|
| 9 | P | 70 | 30 | — | 410 | 259 | 0.120 | 100 | 100 | 100 | 8 |

*1BR01 manufactured by Japan Synthetic Rubber Co., Ltd.
*2SBR 1500 manufactured by Japan Synthetic Rubber Co., Ltd.
*3Measured according to JIS K 6301
*4Viscoelastic spectrometer of Iwamoto Seisakusho (Frequency 10 Hz) used
*5Shown by index taking "Comparative Example 9" as 100
*6Processability = roll processability + extrusion processability Roll processability and processability at extrusion (profile, speed) were evaluated according to the following evaluating marks.
roll processability    extrusion processability
5 4 3 2 1              5 4 3 2 1
good ←                 good ←
*7 30 parts by weight of aromatic oil used

EFFECTS OF THE PRESENT INVENTION

The rubber composition containing the specific block copolymer obtained according to the present invention has excellent wet skid property, the ice skid property and the rolling friction property as well as the breaking properties, and is further excellent in the processability. Thus, the rubber composition according to the present invention is suitable for the rubber material in the tire treads.

What is claimed is:

1. A rubber composition containing at least 20% by weight of a styrene-butadiene block copolymer consisting of a block (A) and a block (B) characterized in that:
   (i) the block (A) is a styrene-butadiene copolymer block having a content of styrene of 10-80% by weight and the average content of the vinyl bonds in the butadiene portion is 30-70% by weight;
   (ii) the block (B) is a polybutadiene block with the average content of the vinyl bonds in the butadiene portion being not more than 60% by weight;
   (iii) the block copolymer contains at least 20% by weight of each of the block (A) and the block (B);
   (iv) the average content of the vinyl bonds in the butadiene portion of the block (A) is greater by at least 5% by weight than that of the block (B);
   (v) the glass transition temperature of the block (A) is higher by at least 30° C. than that of the copolymer block (B);
   (vi) the whole content of the bound styrene in said block is 5–40% by weight;
   (vii) the ratio Mw/Mn between the weight average molecular weight Mw and the number average molecular weight Mn of the block copolymer is 1.8–5.0 when calculated as polystyrene according to the gel permeation chromatogram; and
   (viii) the Mooney's viscosity ($ML_{1+4}^{100°\,C.}$) of the block copolymer is 20–150,
   wherein the styrene-butadiene block copolymer is produced by a continuous copolymerization method.

2. A rubber composition according to claim 1, wherein at least one metal selected from the group consisting of Si, Sn, Pb and Ge is present in an amount of not less than 50 ppm in said block copolymer.

3. A rubber composition according to claim 1, wherein the styrene content of the block (A) is from 20 to 80% by weight.

4. A rubber composition according to claim 3, wherein the styrene content of the block (A) is from 25 to 75% by weight.

5. A rubber composition according to claim 1, wherein the average content of the vinyl bonds in the butadiene portion in the block (A) is from 35 to 70% by weight.

6. A rubber composition according to claim 1, wherein the average content of the vinyl bonds in the butadiene portion in the block (B) is not more than 55% by weight.

7. A rubber composition according to claim 1, wherein the block copolymer contains at least 30% by weight of each of the block (A) and the block (B).

8. A rubber composition according to claim 1, wherein the glass transition temperature of the block (A) is higher by at least 40° C. than that of the copolymer block (B).

9. A rubber composition according to claim 1, wherein the whole content of the bound styrene in the block copolymer is from 10 to 40% by weight.

10. A rubber composition according to claim 9, wherein the whole content of the bound styrene in the block copolymer is from 15 to 35% by weight.

11. A rubber composition according to claim 1, wherein the ratio Mw/Mn is from 1.8 to 3.0.

12. A rubber composition according to claim 1, wherein a molecular distribution of the block copolymer is unimodal.

13. A rubber composition according to claim 1, wherein the rubber composition contains at least 30% by weight of the block copolymer.

14. A rubber composition according to claim 1, wherein the content of the whole bound vinyl bonds in the block copolymer is from 25 to 60% by weight.

* * * * *